Aug. 14, 1951  D. P. FORBES  2,564,158
VEHICLE WHEEL
Filed Nov. 3, 1947  2 Sheets-Sheet 1

INVENTOR.
Duncan P. Forbes
BY McCanna and Morsbach
ATTYS.

Aug. 14, 1951 D. P. FORBES 2,564,158
VEHICLE WHEEL
Filed Nov. 3, 1947 2 Sheets-Sheet 2
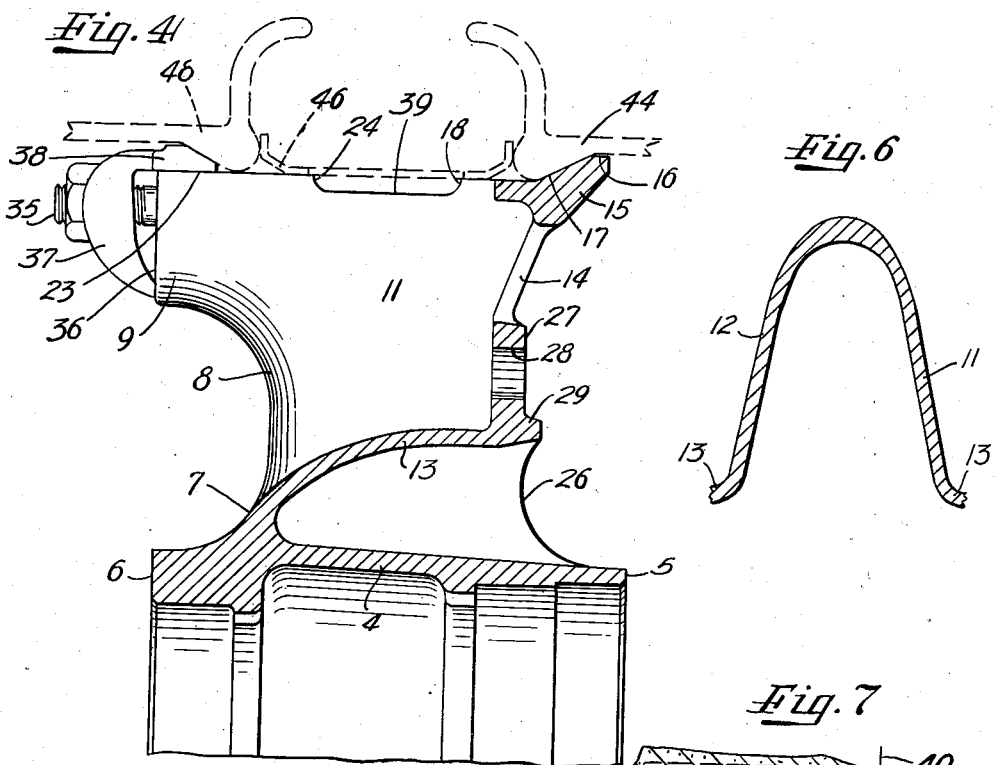
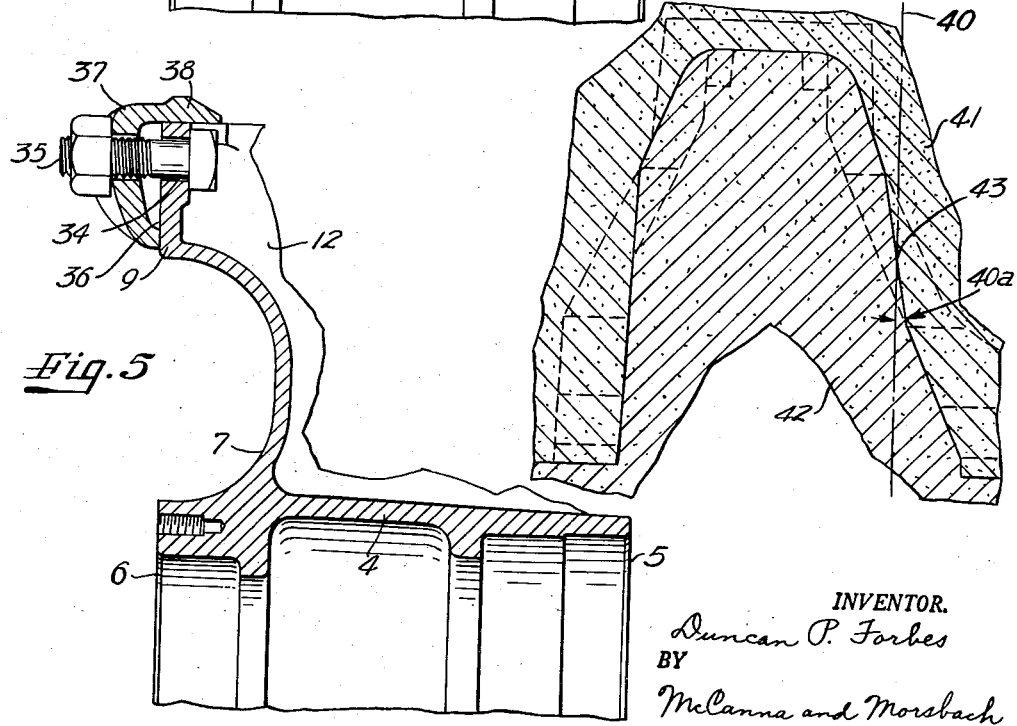
INVENTOR.
Duncan P. Forbes
BY
McCanna and Morsbach
ATTYS.

Patented Aug. 14, 1951

2,564,158

UNITED STATES PATENT OFFICE 2,564,158

VEHICLE WHEEL

Duncan P. Forbes, Rockford, Ill., assignor to Gunite Foundries Corporation, Rockford, Ill., a corporation of Illinois Application November 3, 1947, Serial No. 783,741

2 Claims. (Cl. 301—13)

This invention pertains to vehicle wheels and, more particularly, to felloeless wheels of the twin or dual tire type wherein a single wheel body or shell including a central hub serves to carry and support a pair of demountable tire rims.

One of the principal objects of the invention is to provide a wheel of the character mentioned which will have a maximum of strength with a minimum of weight and bulk, the preferred construction being a single casting in which the web (that portion from the hub to the rim seats and corresponding to the spokes of a conventional wheel) is of sinuous configuration, and relieved or cut away at various places for lightness, access and other purposes, the resultant structure affording great strength with lightness at relatively low cost.

Another of the primary objects of the invention is to provide a construction of such character that, while the web portion of the shell or body, is sinuous in circular section about the hub and relieved at various places about its felloeless circumference and elsewhere, there will be substantially direct radially extending columnar support from the hub to the rim seats at the circumference for both the inner and outer tire rims.

Still another object is to provide a construction of such character that a wheel of the type specified above may be cast in a two part mold, and the pattern easily may be withdrawn from the molding sand without disturbing the sand impression.

A further object of the invention is to provide a wheel structure of such character that it may be cast in a permanent mold by the use of only a single central core to form the opening in the hub.

A still further object is to provide a construction that will offer maximum strength and resistance to twisting and bending forces which become effective under running conditions as, for instance, where one of the dual tires is running on or over the edge of the pavement and the adjacent tire is running over or on the road shoulder at a higher or lower level, thereby imposing a greater load on one side of the wheel than on the other.

Other objects as well as advantages of the invention will be understood and appreciated after reading the following description and claims and after viewing the drawings in which:

Fig. 4 is a sectional view substantially on the line 4—4 of Figure 1;

Fig. 5 is a sectional view substantially on the line 5—5 of Figure 1;

Fig. 6 is a fragmentary section substantially on the line 6—6 of Figure 1, and

Fig. 7 is a fragmentary developed view through an assembled two-part mould showing location of the parting line of the mould which may be either a sand or permanent mould.

Figure 1:
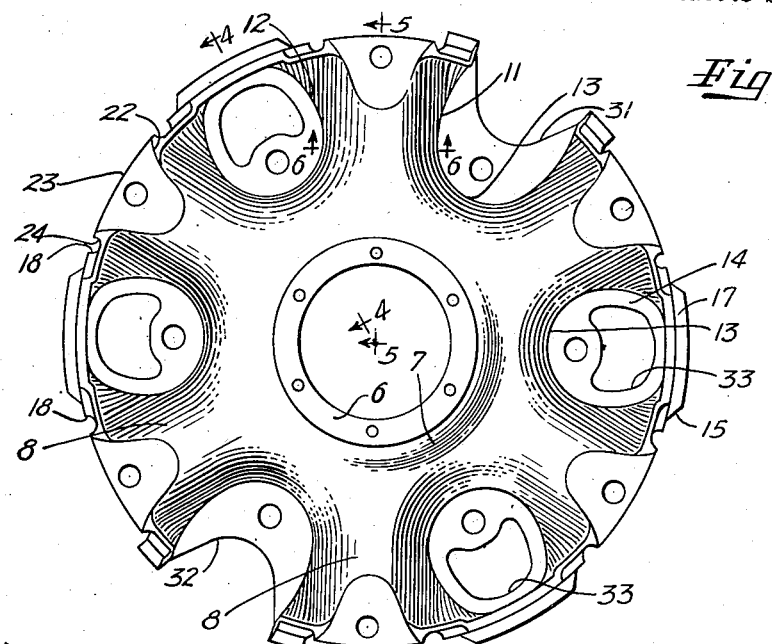
Figure 1 is an elevational view of the outboard side of a dual rim and tire wheel constructed in accordance with a preferred form of the invention.

Exemplified in the drawings is a wheel of a presently preferred form of the invention. It is made of cast metal preferably steel in a two-part mould with which only one core, namely, that for the hole through the hub, is employed, and for the formation of which, apart from the single core, only one pattern piece is needed.

The wheel shown comprises a hollow hub part generally designated 4 having an inboard end 5 and an outboard end 6, and a felloeless web or shell part, extending sinuously circumferentially about and radiating from the hub with which it is integral. Immediately surrounding the hub and integral therewith is an annular wall 7 which, in this instance, is dished inwardly at a slight angle to a plane perpendicular to the axis of the hub. The contour of the surface of wall 7 is continued radially outwardly in places spaced angularly about the circumference of the hub to form the outboard walls 8 of wheel spokes (there being six such spokes in the wheel shown), the walls 8 at their radially outward ends being turned outwardly on suitable radii to provide portions 9 overhanging the outboard face or side of the wheel. All of the portions 9 terminate in flat surfaces at the same plane perpendicular to the hub axis for a purpose to be described.

Integral with each of the outboard walls 8 are curved, inclined side walls 11 and 12 which form side walls for the spokes, the inner ends of these side walls of adjacent spokes terminating short of the hub and being interconnected by arcuate walls 13 integral with the side walls 11 and 12 of adjacent spokes and with the annular wall 7. As will be apparent from Fig. 4, the walls 13 are in effect continuations of the annular wall 7 intermediate the spokes and curve outwardly away from the hub, terminating in spaced relation to the hub adjacent the inboard end of the hub. The inboard edges of walls 11, 12 and 13 are interconnected by inboard walls 14, in this instance dished outwardly toward the periphery of the wheel, the walls 14 being integral with the side walls 11 and 12 of adjacent spokes and with the walls 13 disposed therebetween, as will be most apparent from Figs. 3 and 4. The walls 7, 11, 12, 13 and 14 are suitably filleted at their junctures to merge smoothly with one another and with adjacent parts, but the general direction of each of the walls 13 is concentric with the hub axis and inclined inwardly toward the outboard side of the wheel to merge with the wall 7.

The radially outer ends of the inboard walls 14 terminate in conically inclined abutments or rim seats designated generally by the numeral 15 in part overhanging the inboard face or side of the wheel. Each abutment 15 has a surface 16 (Figs. 2 and 4) which forms a portion of a cylinder concentric with the hub axis and an inclined surface 17 forming a portion of a cone, the angle of generation of which is the same as that of the companion part of a conventional wheel rim, commonly about 28°, and the axis of which is coincident with the hub axis. At the edge of the inclined surface 17 of each rim seat 15 and over adjacent areas of the outer ends of walls 11 and 12, are inboard spacer seats formed by upstanding shoulders or portions 18 on the walls 11 and 12 and 14 having inboard spacer seating surfaces 19 forming a portion of a cylinder concentric with the hub axis. At the outer end of each of the spokes defined by the walls 8, 11 and 12 and adjacent the outboard side of the wheel is an outboard lug seat 22, in this instance including a flange on the outer edges of the wall. While the lug seats may take any preferred shape capable of properly supporting the rim lugs, those herein shown each have an arcuate seating surface 23 concentric with the axis of the hub and on the same radius as the inboard spacer seating surfaces 19. Outboard spacer seats are formed by upstanding portions 24 on the outer edges of the walls 11 and 12 and have spacer seating surfaces 25 coplanar with the inboard spacer seating surfaces 19 and the lug seating surfaces 22. It will be understood that the surfaces 16, 17, 19, 23 and 25 are machined to the correct dimensions and angles.

Directly beneath the center (measured circumferentially of the wheel) of each wall 13 and extending radially from the hub 4 and therealong from a position underlying the inboard wall 14 to the rear or inner face of the annular wall 7 is an integrally cast rib or column 26, the sides of which are slightly tapered because of the taper given the pattern to provide the necessary draft for removal of the pattern from the mould. On the rear faces of the inboard wall 14 are bosses 27 which are finally machine faced and drilled as at 28 for positioning and securing a brake drum (not shown) concentricity of which with respect to the hub axis is determined by arcuate ledges or bosses 29 which lie just outward and over the ribs 26 and upon which the drum rests.

To provide space for projection of the valve stem and driving plates forming parts of a convention tire rim mounted on the inboard side of the wheel, one of the inboard rim seats and the adjacent inboard wall is notched out as at 31 and the diametrically opposite rim seat and wall is likewise notched as at 32 to provide symmetry and balance, and also to permit the location of a tire valve stem and driving plates therethrough if desired. The remainder of the inboard walls may if desired, be provided with central openings as shown at 33 to reduce the weight of the wheel.

The outboard sides 36 of the spokes adjacent the lug seats are drilled as at 34 (Figs. 4 and 5) for the reception of lug bolts 35 and provide bearing surfaces for rim lugs 37 which have a wedge portion 38 resting on the lug seating surfaces 23 to retain the rims in position on the wheel.

Figures 2, 3:
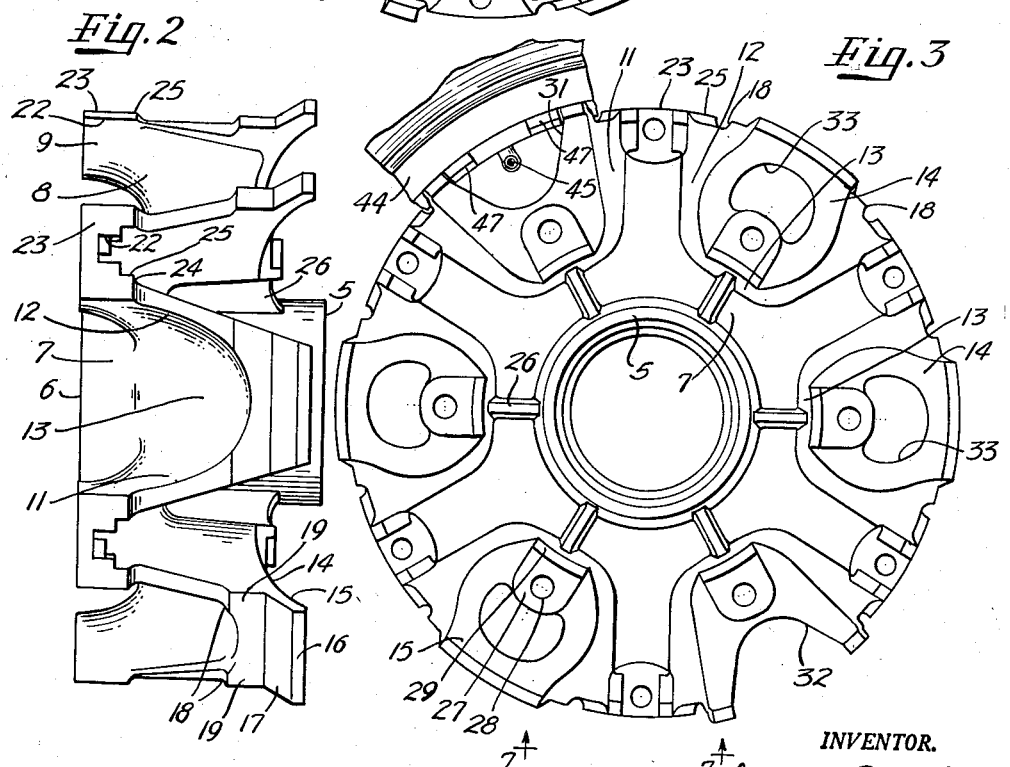
Fig. 2 is an edge view of the wheel of Figure 1.
Fig. 3 is an elevational view of the inboard side of the wheel shown in the other figures.

The outer ends of side walls 11 and 12 each have a recess 39 between the upstanding spacer seats 18 and 24 as will be most apparent from Figs. 2 and 4, which effect a substantial reduction in the cost of machining the wheel, permit easy mounting of the inner rim, and provide for communication between the sections of the wheel at its periphery. A feature of this invention is the provision of a structure permitting the production of these recesses during the casting of the wheel and without the use of expensive or complicated cores.

Referring now more particularly to Fig. 7, this figure is a fragmentary developed section adjacent the periphery of the wheel showing the cope and the drag sections of the mould (or the two sections of a permanent mould) and the position of the parting line at each of the recesses 39. The numeral 41 indicates the cope of a conventional two-part foundry mould, and 42 indicates the drag. The pattern is indicated by dotted lines, and the solid line 43 indicates the parting line. It will be seen that the angles of the walls 11 and 12 are such that the parting line across the recesses 39 is tangent to the diagonally opposed corners formed by the junction of upstanding portions 18 and 24 with opposite sides of the walls. The dot and dash line 40 designates a plane containing the wheel axis and intersecting one of the walls 11 and 12 at about the midpoint of the radially outer periphery thereof, the relative movement of the mould sections in separating the same being parallel to this plane. As a result, the cope and the drag portions of the mould can be separated from the pattern without disturbing the sand, and when assembled into the completed mould will meet in the areas required to produce the recesses 39. Where a permanent mould is employed the mould is so constructed that the parts meet along the parting line 43 so that the mould can be separated from the solidified casting.

The relationship of the rims and spacer for dual tires is best shown in Figs. 3 and 4. One rim designated 44 is disposed inwardly of the inboard side of the wheel and is designed to rest on and to overhang inwardly from the rim seats with its gutter engaged with and positioned by the conical surfaces 17, the valve stem 45 of the tire and the drive plates 47 of the rim being disposed through one of the notches or gaps 31 and 32 with the drive plates engaged against the edges of the notches to prevent rotation between the rim and the wheel. A spacer ring 46 abuts against the adjacent side of the gutter of rim 44 and is supported and located by the cylindrical surfaces of spacer seats 19 and 25 with which it has a sliding fit. The outer rim 48 has its inner gutter edge abutted against the outer edge of spacer 46 and is held in its proper position by the lugs 37, the wedges of which are drawn into and held in place by the bolts 35.

It will now be apparent that each rim has substantially direct radial support from each rim seat to the hub so that the net effect of forces acting on the rims will be a direct thrust in compression against either the spokes or the inboard walls 14 as the case may be. With such construction there is no tendency for the spokes to spread apart under load and lateral stresses on both spokes and ribs are minimized if not eliminated. With all the wheel described has unusual structural strength for its weight, such results being directly attributable to its unique construction.

While a preferred embodiment has been illustrated and described, many changes and variations may be adopted without departure from the invention spirit and the scope of the following claims.

I claim:

1. The combination in a cast metal felloeless vehicle wheel for dual tires of a hub, an annular wall adjacent the outboard end of the hub extending therefrom to form a continuous annular surface projecting radially outward from the hub, angularly spaced outboard walls projecting from the annular wall constituting spaced radial continuations of said annular wall and forming the outboard side of wheel spokes, curved, inclined portions integral with and forming side walls for said spokes, said side walls terminating short of the hub, arcuate walls integral with and interconnecting opposed side walls of adjacent spokes with the first mentioned annular wall in spaced relation to the outer surface of the hub, inboard walls disposed axially adjacent the inboard end of the hub integral with and interconnecting said arcuate walls with opposed side walls of adjacent spokes along the inboard side of the wheel, the space between the walls defining each wheel spoke and the space between said arcuate walls and the hub being open on the inboard side of the wheel, inboard rim seats at the outer peripheral ends of said inboard walls bridging the side walls of adjacent spokes, lug seats at the outer peripheral ends of the outboard walls, and radially disposed ribs extending longitudinally of the hub integral with and interconnecting the hub and said arcuate walls radially inward from the inboard rim seats.

2. The combination in a cast metal felloeless vehicle wheel for dual tires of a hub, a web integral with the hub and projecting annularly therefrom, the outer periphery of said web having a sinuous configuration formed of spaced alternate inboard and outboard walls and interconnecting walls angularly disposed with respect to the axis of the hub, inboard rim seats at the ends of the inboard walls spanning the inboard ends of adjacent interconnecting walls and having arcuate rim seating surfaces concentric about the axis of the hub, and outboard lug seats at the ends of the outboard walls spanning the outboard ends of adjacent interconnecting walls and having arcuate seating surfaces concentric about the axis of the hub, but closer thereto than the inboard arcuate rim seating surfaces to permit passage of an inboard rim over said outboard arcuate seating surfaces, each of said interconnecting walls being angularly inclined with respect to a radial plane containing the hub axis and extending outward therefrom and intersecting said wall at the midpoint of the radially outer periphery thereof such that the entire thickness of said wall adjacent the inboard rim seat is disposed to one side of said plane and the entire thickness of said wall adjacent the outboard rim seat is disposed to the other side of said plane, each of said interconnecting walls being formed with a recess in its radially outer periphery.

DUNCAN P. FORBES.

REFERENCES CITED

The following references are of record in the file of this patent:

UNITED STATES PATENTS

| Number | Name | Date |
| --- | --- | --- |
| 1,640,339 | Kay | Aug. 23, 1927 |
| 1,675,934 | Kay | July 3, 1928 |
| 1,751,086 | Hunt | Mar. 18, 1930 |
| 1,896,821 | Keller | Feb. 7, 1933 |
| 1,991,489 | Booth | Feb. 19, 1935 |
| 2,022,153 | Rogers | Nov. 26, 1935 |
| 2,414,156 | Malthoner | Jan. 14, 1947 |
| D. 154,761 | Forbes | Aug. 9, 1949 |

FOREIGN PATENTS

| Number | Country | Date |
| --- | --- | --- |
| 41,522 | France | Nov. 3, 1932 |

Certificate of Correction

Patent No. 2,564,158 August 14, 1951

DUNCAN P. FORBES

It is hereby certified that error appears in the printed specification of the above numbered patent requiring correction as follows:

Column 5, line 23, before "therefrom" insert *outwardly*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*